Jan. 30, 1934.  U. ANTONI  1,945,410
DEMOUNTABLE WHEEL
Filed May 8, 1930
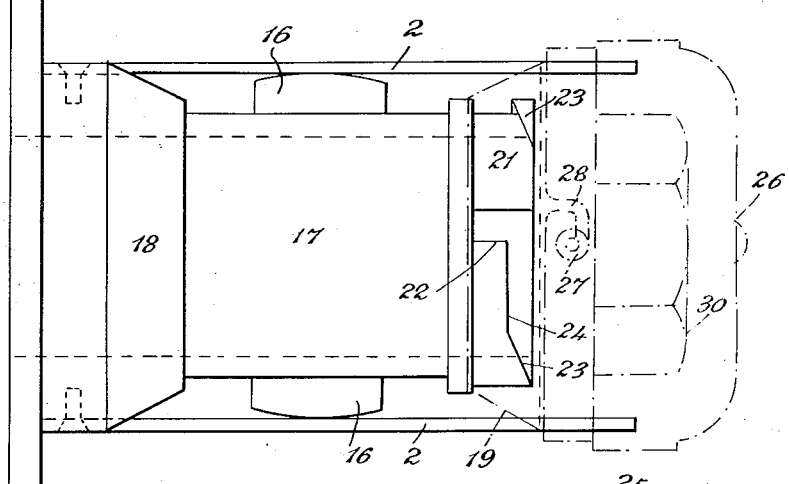
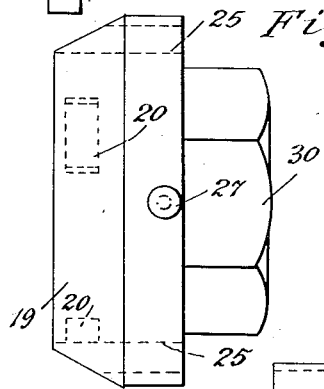
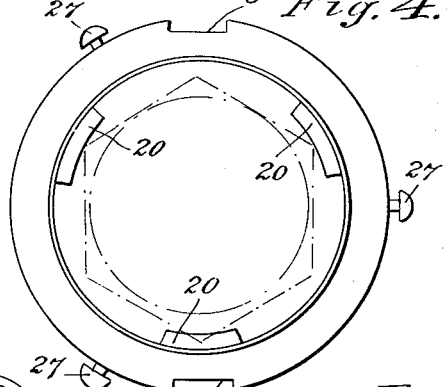
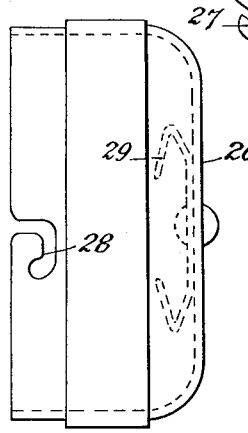
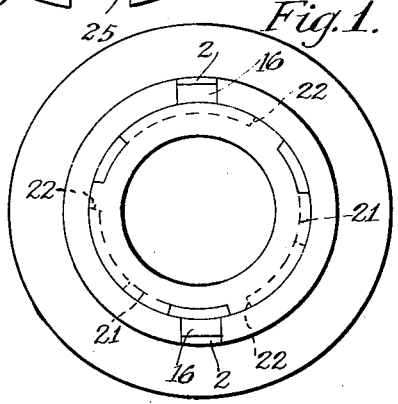
U. Antoni
INVENTOR
By Mass & Clay
Attys Patented Jan. 30, 1934

1,945,410

UNITED STATES PATENT OFFICE 1,945,410

DEMOUNTABLE WHEEL

Ugo Antoni, Viareggio, Italy

Application May 8, 1930, Serial No. 450,845, and in Italy May 10, 1929

3 Claims. (Cl. 301—9)

The object of this invention is to provide a device for permitting the rapid mounting and dismounting of vehicle wheels in general and motor vehicle wheels in particular.

The invention consists in a device for mounting vehicle wheels and like uses, comprising a wheel-carrying axle or axle bush having at its free end bayonet recesses comprising a first portion inclined to the wheel axis and a second portion normal to the wheel axis, and a locking member having internal teeth adapted to engage in the bayonet recesses for locking the wheel on the axle or bush.

The invention further comprises a device for mounting vehicle wheels and like uses comprising a wheel-carrying axle or axle bush, a cone on this axle, bayonet recesses at the free end of the axle, a locking member bearing a hollow cone and having internal teeth in this cone adapted to engage in the recesses in the wheel axle or axle bush, the bayonet recesses having a first portion inclined to the wheel axis and a second portion normal to this axis.

According to a further feature of the invention, means are provided for locking this second cone in place when its teeth have reached the end of their travel in the bayonet recesses.

According to a still further feature of the invention, these means consist of flexible arms secured at one end to the cone on the axle or axle bush and adapted at their free ends to engage in notches on the second cone when the latter is mounted in position.

In order that the invention may be clearly understood, one embodiment will now be described by way of example with reference to the accompanying drawing, in which:

Figure 1 shows a front view of a wheel axle bush constructed according to the invention.

Figure 2 shows a side view of this bush fitted with flexible locking arms and an end cover or hub cap.

Figure 3 shows a side view of a member cooperating with the flexible arms.

Figure 4 is a front view of this member.

Figure 5 is a side view of the hub cap.

Figures 1 and 2 show an ordinary axle bush 17 for a motor vehicle wheel. This bush is mounted on the wheel axle and has one or more retaining teeth 16 which engage in suitable recesses in the spoke-carrying wheel hub in order to ensure a perfect rotational locking between the two parts.

According to the invention the wheel is locked against movement in the longitudinal direction of the axle between two cones 18, 19. The former of these cones forms part of the bush 17 while the latter is separate from the bush and has in its interior a number of teeth 20 (Figures 3 and 4). When the wheel has been mounted on the bush 17 and the cone 19 is put in place, these teeth 20 simultaneously engage a like number of bayonet recesses 21 provided in the bush, whereupon the cone can be partially rotated until the teeth 20 reach the abutment surfaces 22.

The bayonet recesses 21 have a first inclined portion 23 over which the teeth 20 move until they engage with a second portion of the recesses having an edge 24 normal to the axis of the bush. During the travel of the teeth over the inclined portions of the recesses, the wheel is pressed by the cone 19 against the cone 18. In order to avoid the necessity of extreme accuracy in manufacture and for efficiently locking the wheel, a thin coating of elastic material may be applied to the cone 18.

The bush 17 carries two flexible arms 2 which extend over its length and are aligned over the teeth 16. These arms 2 operate inwardly; that is to say they resist any action tending to open them apart. When the wheel is mounted and the cone 19 is placed in position, the taper of this cone forces the arms 2 apart until they ride on the periphery of the member 19. When the teeth 20 reach the abutment surfaces 22 at the ends of the bayonet recesses 21, the flexible arms 2 snap in the notches 25 in the outer edge of the cone 19, thereby preventing any return movement of this cone.

The wheel can readily be removed with the aid of a suitable spanner having a bevel edged mouth for forcing the arms 2 apart and disengaging them from the notches 25.

For greater safety and for the sake of appearance, an end cover or hub cap 26 (Figure 5) may be used. This cap has slots 28 which can be snapped into engagement with small pins 27 on the member 19. A spring 29 in the cap 26 then presses against the hexagonal head 30 of the cone 19 and prevents the cover 26 from becoming disengaged from the pins 27. The cover 26 can be removed with the greatest facility by pressing it against the wheel and rotating the cover in the opposite direction to that in which it is rotated for engaging the pins. The purpose of the cover therefore is to prevent the undesired disengagement of the elastic arms 2 from the notches 25 and to ensure that they engage in the said notches, failing which it would be impossible to put the cover 26 in place. In this way the risk of defective mounting of the road wheel is obviated.

Having now particularly described and ascertained the nature of my said invention and in what manner the same is to be performed I declare that what I claim is:

1. A device for mounting vehicle wheels and like uses, comprising a wheel carrying axle or axle bush, a cone integral with one end of this axle, wheel locating means on said axle whereby rotation of a wheel on said axle will be prevented, bayonet recesses at the free end of the axle, the bayonet recesses having a first portion inclined to the wheel axis and a second portion normal to this axis, a removable hollow cone adapted to be mounted on the free end of the axle whereby the wheel will be centered on the axle between the said fixed and removable cones, internal teeth in the removable hollow cone adapted to engage in the recesses on the wheel axle, whereby a wheel when placed on the axle can be wedged between said fixed and removable cones by the wedging action of the teeth on the hollow cone coacting with the inclined portion of the said bayonet recesses and thereafter locked on the axle by the said teeth coacting with the portion of said recesses normal to the wheel axis.

2. A device for mounting vehicle wheels and like uses as claimed in claim 1, further comprising flexible arms secured at one end to the cone integral with the axle and extending over wheel locating lugs provided on the axle, the free ends of said flexible arms being engageable in notches in the outer periphery of the said removable hollow cone.

3. A device for mounting vehicle wheels and like uses as claimed in claim 1, further comprising flexible arms secured at one end to the cone integral with the axle and extending over wheel locating lugs provided on the axle, the free ends of said flexible arms being engageable in notches in the outer peripehry of the said removable hollow cone, an end cover adapted to engage over the locking cone member and prevent any disengagement of the flexible arms from the notches in this cone, the cover having slots engaging with pins on the cone member and elastic means for holding the pins in engagement with the slots.

UGO ANTONI.